(12) United States Patent
Terrats Bes et al.

(10) Patent No.: US 11,179,227 B2
(45) Date of Patent: Nov. 23, 2021

(54) DENTAL SCANNING POST AND METHOD FOR THE MOUNTING AND FIXING THEREOF ON A DENTAL IMPLANT OR A REPLICA OF SAME

(71) Applicant: Terrats Medical, S.L., Barbera del Valles (ES)

(72) Inventors: Jordi Terrats Bes, Barcelona (ES); Ramon Terrats Bes, Sant Quirze del Valles (ES)

(73) Assignee: Terrats Medical, S.L., Barberà del Vallès (ES)

(*) Notice: Subject to any disclaimer, the term of this patent is extended or adjusted under 35 U.S.C. 154(b) by 655 days.

(21) Appl. No.: 15/533,871

(22) PCT Filed: Mar. 3, 2016

(86) PCT No.: PCT/ES2016/070137
§ 371 (c)(1),
(2) Date: Jun. 7, 2017

(87) PCT Pub. No.: WO2016/142562
PCT Pub. Date: Sep. 15, 2016

(65) Prior Publication Data
US 2017/0333163 A1    Nov. 23, 2017

(30) Foreign Application Priority Data

Mar. 10, 2015   (ES) .................................. 201530304

(51) Int. Cl.
*A61C 8/00* (2006.01)
*A61C 9/00* (2006.01)

(52) U.S. Cl.
CPC ............ *A61C 8/0001* (2013.01); *A61C 8/006* (2013.01); *A61C 8/0066* (2013.01);
(Continued)

(58) Field of Classification Search
CPC ................. A61C 8/0001–0098; A61C 9/0053
See application file for complete search history.

(56) References Cited

U.S. PATENT DOCUMENTS

| 6,168,436 B1 | 1/2001 | O'Brien |
| 6,283,752 B1 | 9/2001 | Kumar |
| (Continued) | | |

FOREIGN PATENT DOCUMENTS

| DE | 20 2015 000 801 U1 | 4/2015 |
| KR | 10-2011-0004551 A | 1/2011 |

OTHER PUBLICATIONS

Communication dated Nov. 29, 2018 from European Patent Office in counterpart EP Application No. 16 709 985.2.
(Continued)

*Primary Examiner* — Yogesh P Patel
(74) *Attorney, Agent, or Firm* — Sughrue Mion, PLLC

(57) ABSTRACT

Dental scan abutment for being assembled and fixed to an implant, provided with an indicator of the radial angular position of the anti-rotation means of the implant. The abutment comprises:
a main body provided with the indicator and with means for connection to the implant, and
means for fixing to the implant formed by a fixing shaft and by an upper head, the lower end of the shaft being a threaded end provided with a thread cutting complementary to the internal cutting of the threaded hole of the implant. The main body is configured for housing and longitudinally displacing the fixing shaft therethrough, the threaded lower end of the shaft being able to be immersed in the interior of the main body or project from the lower section thereof, the complete removal of the fixing shaft by simple longitudinal displacement being prevented by mechanical stop.

14 Claims, 4 Drawing Sheets

(52) U.S. Cl.
CPC .......... *A61C 8/0068* (2013.01); *A61C 8/0074* (2013.01); *A61C 9/0053* (2013.01)

(56) References Cited

U.S. PATENT DOCUMENTS

| | | | | |
|---|---|---|---|---|
| 2003/0224331 A1* | 12/2003 | Kumar | ............... | A61C 8/005 |
| | | | | 433/173 |
| 2005/0136379 A1 | 6/2005 | Niznick | | |
| 2008/0233538 A1 | 9/2008 | Hug et al. | | |
| 2008/0261176 A1* | 10/2008 | Hurson | ............ | A61C 8/0069 |
| | | | | 433/174 |
| 2009/0123887 A1* | 5/2009 | Brajnovic | ......... | A61C 8/0001 |
| | | | | 433/75 |
| 2012/0295223 A1* | 11/2012 | Robb | ............ | A61C 13/0003 |
| | | | | 433/173 |
| 2013/0244203 A1* | 9/2013 | Magnusson | ......... | A61C 8/0001 |
| | | | | 433/173 |
| 2014/0113252 A1* | 4/2014 | Hung | ............... | A61C 8/0066 |
| | | | | 433/201.1 |

OTHER PUBLICATIONS

Written Opinion of the International Searching Authority of PCT/ES2016/070137 dated May 27, 2016.
International Search Report of PCT/ES2016/070137 dated May 27, 2016.

\* cited by examiner

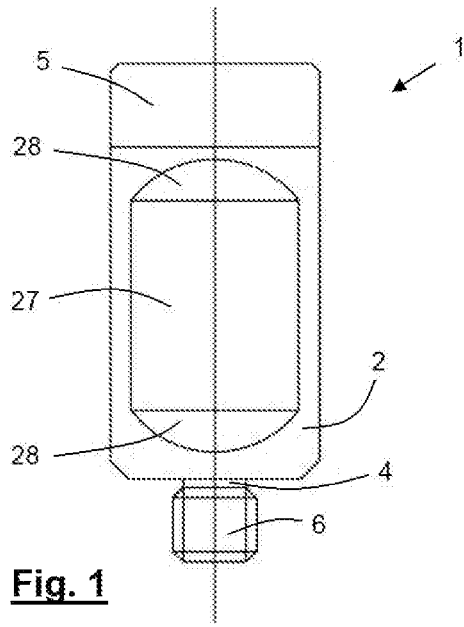
Fig. 1
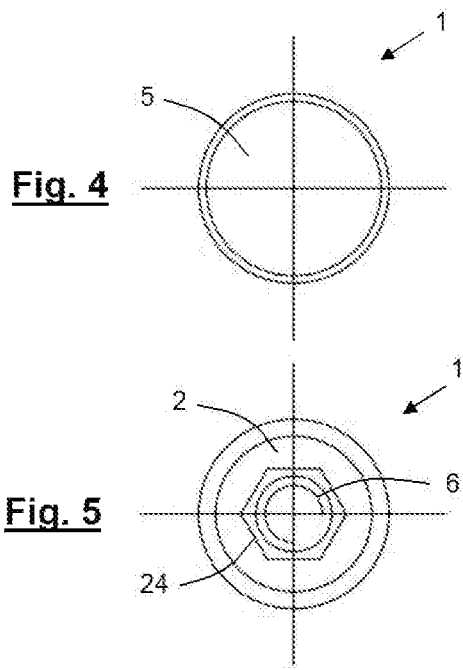
Fig. 4
Fig. 5
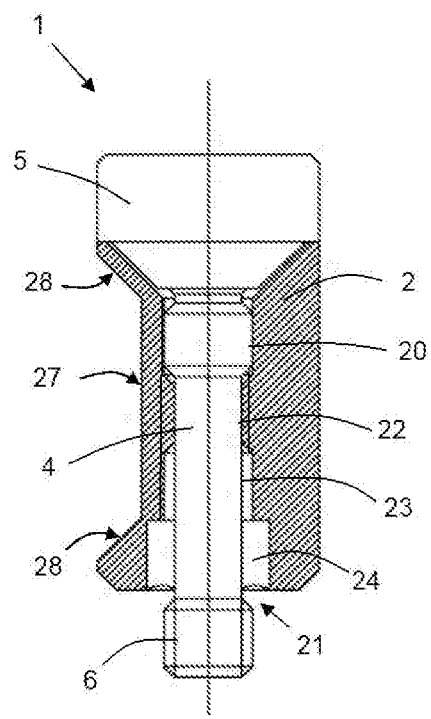
Fig. 2
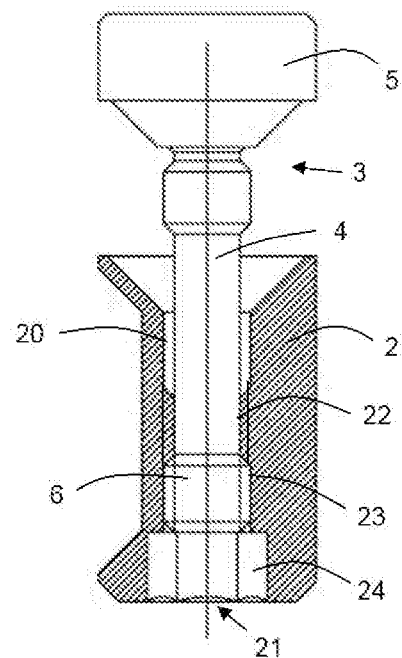
Fig. 3

DENTAL SCANNING POST AND METHOD FOR THE MOUNTING AND FIXING THEREOF ON A DENTAL IMPLANT OR A REPLICA OF SAME

This application is a National Stage of International Application No. PCT/ES2016/070137 filed Mar. 3, 2016, claiming priority based on Spanish Patent Application No. 20150304 filed Mar. 10, 2015, the contents of all of which are incorporated herein by reference in their entirety.

TECHNICAL FIELD OF THE INVENTION

The present invention relates to a dental scan abutment, adapted for the assembly and fixing thereof to a dental implant or a replica of the same which is provided with anti-rotation means and a hole, which is internally threaded or unthreaded. The abutment is provided with an indicator of the radial angular position of the anti-rotation means of the implant or of the replica thereof when the abutment is in an operative fixing position.

The invention also relates to a method for the assembly and fixing of the abutment to a dental implant or to a replica of the same.

BACKGROUND OF THE INVENTION

The technique of scanning is common in the manufacturing processes of dental prostheses in implantology applications. Essentially there are two application groups of said technique.

The first group, the older and more generalized, consists of scanning a reproduction in a material similar to plaster of the jaw of the patient, where the implants have been substituted for replicas of the same inserted in the cited reproduction. Specific abutments designed to be scanned are fixed on these replicas.

The second group, which has more recently emerged and which is gaining ground with respect to the previous one, consists of inserting scan or scannable abutments, fixed directly on the implant anchored in the jaw of the patient, in this case, naturally, the scan is effected in an intraoral manner.

In both cases, the result obtained from the scan serves as the base for the design and the manufacture of the dental prostheses.

There are a number of models of scan abutments on the market, with a number of criteria in terms of material, surface roughness, color, size and geometry, generally being distinguished for each one of the two groups of application previously indicated.

The basic criteria which the cited scan abutments should meet, is to provide the most exact possible information regarding:
  the spatial position of the implant with respect to the jaw;
  the angulation of the implant with respect to the reference plane; and
  the position of the anti-rotation geometric figure or of the anti-rotation means of the implant, in the radial direction, for which the implants are usually provided with a flat face or surface, substantially parallel to the axis and asymmetric.

Furthermore, the scan abutments should produce the minimum distortion possible to the scanned image, that is to say, preventing shining being produced in the images obtained, noises, or any other undesired phenomenon which causes them.

Given that a scan abutment should be designed and manufactured such that it can be fixed to the implant or, as the case may be, to the replica of the implant for which it is intended in a secure manner, these abutments are commonly screwed to the support, whether it is an implant or a replica of the same. Obviously, the use of a screw involves the body of the scan abutment providing said access to the screw by way of the same up to the threaded area of the implant or that of the replica, these types of scan abutments being provided with a hole passing through them in the direction of the longitudinal axis thereof.

In addition to the screwed joint, there are also other alternatives for assembling the scan abutment on the implant or on the replica thereof, for example some designs can be assembled by contact or pressure, although if the attachment is not screwed, the position precision thereof is not very reliable or completely unreliable.

In practice, the access mentioned for the screw produces undesired noises in the scanning process of said scan abutments, whether in the scanning of the reproduction of the jaw of the first group or in the intraoral scanning of the second. This noise or distortion is a serious drawback and notably reduces the quality of the images and measurements obtained, prior to and necessary for the design of the prosthesis. What is more, the most critical measurement area in many of the prosthetic restoration procedures is at the apical end of the scan abutment which is used as reference for measuring the height positioning of the implant to which it is connected, producing an error which can be very significant as the case may be and makes good settling, free of tensions, of mentioned prosthesis on the implants impossible.

The need for a scan abutment which can be fixed to the implant or to the replica thereof in a simple, but secure manner for precisely transmitting the position thereof and which avoids the problems of noise during the scanning is thus revealed.

DESCRIPTION OF THE INVENTION

With the aim of providing a solution to the drawbacks set out, a dental scan abutment is made known, adapted for the assembly and fixing thereof to a dental implant, provided with anti-rotation means and an internally threaded hole or to a replica of the implant. The dental abutment object of the invention is provided with an indicator of the radial angular position of the anti-rotation means of the implant or of the replica thereof when the abutment is in an operative fixing position.

In essence, the abutment object of the invention is characterized in that it comprises:
  a main body provided with the indicator of the angular position and with connection means for connection to the implant or to the replica thereof arranged in a lower section of the main body, and
  fixing means for fixing to the implant formed by a fixing shaft and by an end head arranged at the upper end of the fixing shaft, the lower end of the fixing shaft being a threaded end with a thread cutting complementary to the internal cutting of the threaded hole of the implant or of the replica to which the abutment is adapted in order to be fixed, in which the thread cutting forms a widening section, in the radial direction, of the diameter of the fixing shaft, and in that the main body is configured for housing and longitudinally displacing the fixing shaft of the fixing means therethrough, the threaded lower end of the fixing shaft being capable of being immersed in the interior of the main body or of projecting from the lower section thereof, the complete removal of the fixing shaft by simply longitudinally displacing the fixing shaft with respect to the main body being prevented by a mechanical stop.

In this way, the coupling of the fixing shaft to the main body is such that it allows the fixing shaft to move longitudinally along the main body (considering the longitudinal direction as that from the upper end to the lower end) but with certain limitations since the fixing shaft cannot be completely separated from the main body accidentally, that is to say, simply attempting to displace the fixing shaft longitudinally, pushing and pulling it, since the complete removal of the shaft is prevented by mechanical stop. Thus, it can be colloquially said that the fixing means are coupled in the manner of a safety pin with respect to the main body.

According to another characteristic of the abutment of the invention, the main body is provided with an axial hole which passes through it from the lower section thereof to the upper section thereof, configured for the housing and displacement of the fixing shaft therethrough, in which said axial hole comprises a retention housing for the threaded lower end of the fixing shaft, formed by a widening, the diameter of which is equal to or greater than the external diameter of the threaded lower end and which is limited at the top by a narrower section of axial hole with an essentially equal diameter to the diameter of the fixing shaft.

According to a characteristic of the invention, the head of the fixing means has a diameter or width greater than the diameter of the fixing shaft and equal to or greater than the diameter or width of the upper section of the main body, and the head is configured to be capable of being manually rotated around the axial axis of the fixing shaft and of transmitting jointly said rotation to the fixing shaft with respect to the main body.

Optionally, the narrower section of axial hole which limits, at the top, the retention housing is a section of a thread cutting complementary to the thread cutting of the threaded end of the fixing shaft, being adapted so that the threaded end is capable of occupying and passing through said section in the longitudinal direction upon rotating the head of the fixing means in one direction or another. With this characteristic, the user of the abutment has the option of the fixing means being able to separate or decouple from the main body of the abutment, which is advantageous for going deeper when cleaning and sterilizing the components of the scan abutment.

This option is compatible with the fact that in the scan abutment the complete removal of the fixing shaft by simply longitudinally displacing the fixing shaft with respect to the main body is prevented by a mechanical stop since in order to completely remove the fixing shaft from the main body, it is necessary for the user to intervene and rotate the head of the fixing means in one direction, specifically in the opposite direction to the direction in which the threaded end of the shaft is threaded to the threaded hole of the implant. Whereas if the user simply attempts to displace the shaft, that is to say, if he pushes the head towards the main body or pull it attempting to remove it, he will never be able to completely remove the fixing shaft from the main body. By pulling the head, the threaded end will stop upwards against the retention housing and pushing it downwards, the head itself will stop against the upper part of the main body since the head has a diameter or a width greater than the diameter of the fixing shaft and equal to or greater than the diameter or width of the upper section of the main body. Thus it is necessary for the user to rotate the head in one direction so that he can completely remove, from above, the fixing shaft from the main body.

According to a first embodiment of the abutment of the invention, particularly indicated for the assembly and fixing to an implant (or to the replica thereof) provided with anti-rotation means with external connection, the connection means for connection to the implant are arranged internally in the lower end section of the main body, being formed by a connection housing arranged in the lower end part of the axial hole of the main body and below the retention housing. The connection housing is configured by a cavity, the interior walls of which reproduce the complementary geometry of the external walls of the anti-rotation means of an implant with external connection or of those of the replica of said implant, allowing the introduction and the adjusted lateral fitting of the anti-rotation means with external connection in the connection housing.

According to a second embodiment of the abutment of the invention, particularly indicated for the assembly and fixing to an implant (or to a replica thereof) provided with anti-rotation means with internal connection, the connection means for connection to the implant or to the replica thereof are arranged externally in the lower end section of the main body, the connection means comprising an end connection area configured by exterior walls which reproduce the complementary geometry of the internal walls of the anti-rotation means of an implant with internal connection or of those of the replica of said implant, said end connection area being capable of being introduced and fitting laterally with adjustment into the anti-rotation means with internal connection of the implant.

According to another characteristic of the second embodiment, the connection means for connection to the implant or to the replica thereof comprise a linking area, below and on top of the end connection area, configured by one conical external surface with equal conicity to that of the cone with internal connection of the implant which precedes the anti-rotation means.

According to another characteristic of the second embodiment, the lower section of the main body in which the connection means are externally arranged coincides internally with the section of the axial hole in which the retention housing for the threaded lower end of the fixing shaft is arranged.

According to another characteristic of the invention, irrespective of whether it is one embodiment or another, the abutment is capable of adopting an operative position for coupling to the implant or to the replica thereof, in which the threaded end of the fixing shaft is introduced into the retention housing at the same time as the connection means for connection to the implant are connected to the anti-rotation means of the implant or of the replica thereof and is also capable of adopting an operative position for fixing to the implant or to the replica thereof, in which the threaded end projects from the main body and is joined by means of a threaded joint to the threaded hole of the implant or the replica thereof.

According to a characteristic of the invention, the abutment is capable of passing from the operative coupling position to the operative fixing position and vice versa by means of rotating the head of the fixing means with respect to the main body.

According to another characteristic of the invention, the external surface of the main body comprises a recess, in the form of a flat surface parallel to the fixing shaft, which constitutes the indicator of the radial angular position of the anti-rotation means of the implant or the replica thereof.

According to another characteristic of the invention, the flat indicator surface of the radial angular position is limited at least at the top and bottom by two flat portions inclined with respect to the flat surface forming a right or obtuse angle with the same.

According to a characteristic of the invention, the head of the fixing means has an external surface, orientated in opposition to the fixing shaft, smooth and without holes, notches or hollows for the fitting of external tools.

According to another characteristic of the invention, the head and the fixing shaft are two bodies separable from each other, capable of being joined at least by one of the following types of joint formed by a threaded, adhesive, pressure or rivet joint.

Alternatively to the foregoing, the head and the fixing shaft are firmly joined forming part of one same body.

According to another aspect of the invention, a method is made known for the assembly and fixing of the dental scan abutment, like the one described previously (irrespective of the embodiment in question) to a dental implant or to a replica of the same, provided with anti-rotation means and an internally threaded hole.

The method of the invention is characterized in that it comprises the steps of:
a) providing the dental scan abutment such that the threaded end of the fixing shaft is introduced into the retention housing;
b) accommodating the abutment on the dental implant or on the replica of the same, until the connection means of the abutment are connected to the anti-rotation means of the implant or of the replica thereof, thus adopting the operative coupling position;
c) rotating the head with respect to the main body according to an axis parallel to the axial axis of the fixing shaft until the threaded end of the fixing shaft projects from the main body and is threaded in the threaded hole of the implant or of the replica thereof.

According to another characteristic of the method, the introduction of the threaded end into the retention housing of stage a) is achieved either by pulling the head of the fixing means upwards, removing it from the main body until the threaded end is retained in the retention housing, or simply as a result of having placed the abutment on the dental implant or on the replica thereof, contacting the threaded end of the shaft with a part of the implant or of the replica thereof and the automatic displacement of the threaded end, as a response to the contact, having been produced until being introduced into the retention housing.

According to another characteristic of the method, the dental implant or the replica thereof are outside the human body. Additionally, according to another characteristic of the method, there is not used any dental implant but a replica thereof and said replica is inserted in a reproduction of a human jaw.

BRIEF DESCRIPTION OF THE DRAWINGS

In the attached drawings, various embodiments of the dental scan abutment object of the invention are illustrated in an exemplary and non-limiting manner. In said drawings:

FIG. 1 is a frontal view of a first embodiment of the abutment object of the invention in which the connection means for connection to the implant are arranged internally in the lower end section of the main body;

FIG. 2 is a longitudinal section view, according to a vertical cut plane, of the abutment of FIG. 1;

FIG. 3 is another longitudinal section view, according to a vertical cut plane, of the abutment of FIG. 1, but in an operative coupling position;

FIG. 4 is a plan view from above the abutment of FIG. 1;

FIG. 5 is a view from below the abutment of FIG. 1;

DETAILED DESCRIPTION OF THE DRAWINGS

Figure 15:
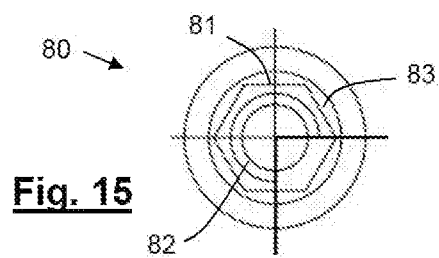
FIG. 15 is a plan view from above of the upper part of the implant of FIG. 14.
Figure 16:
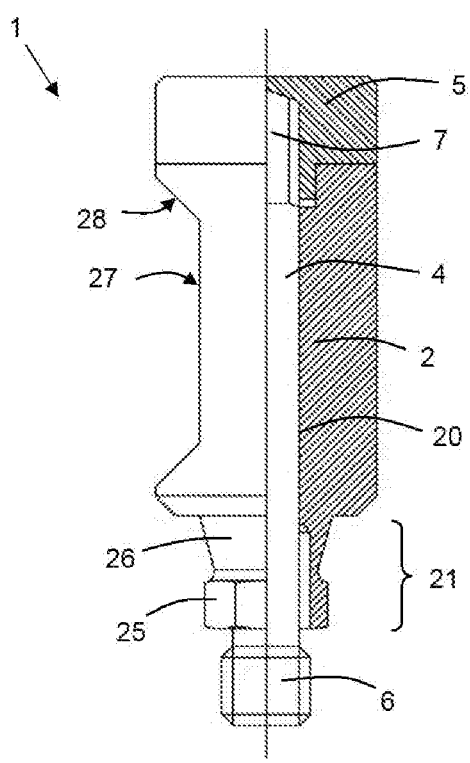
FIGS. 16 and 17 show respective longitudinal section views, according to a vertical cut plane, of the embodiment of the abutment of the invention shown in FIG. 13 in an operative fixing position and in an operative coupling position, respectively, in which the connection means for connection to the implant are arranged externally on the lower end section of the main body and in which the fixing shaft and the head are firmly joined.
Figure 17:
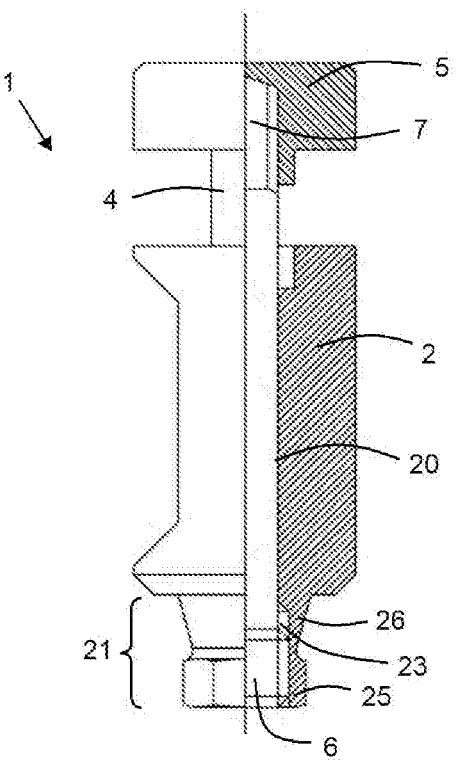

In the FIGS. 1 to 3, 8 to 9 and 16 to 17, three embodiments of dental scan abutments 1 are shown, which are assembled and fixed to dental implants 80 or to replicas of the same to provide the necessary information regarding the spatial position of the implants with respect to the jaw, the angulation thereof and the radial angular position of the anti-rotation means 81 of the implants, obtained by means of intraoral scanning of the oral cavity of the patient or of a reproduction of his jaw in which the replicas of the implants 80 are inserted. Specifically, the abutments 1 of FIGS. 1 to 3 and 8 to 9 are adapted for being assembled and fixed to the implants 80 (or the replicas thereof) like the one partially depicted in FIGS. 11 and 12, which comprises anti-rotation means 81 with external connection while the abutments 1 of FIGS. 16 and 17 are adapted for the assembly and fixing thereof to implants 80 (or the replicas thereof) like the one in FIGS. 14 and 15 in which the anti-rotation means 81 have an internal connection. The dental scan abutments 1 can be manufactured, for example in polyether ether ketone, a material known as PEEK, stainless steel, zirconium, aluminum or another metal or plastics with similar capabilities. For guidance, the abutment 1 depicted in FIGS. 1, 2, 8 and 16 has a length (measured in the vertical direction) of approximately 10 mm.

Hereinafter, everything said with reference to the dental implants 80 will be equally valid for the replicas of the implants, although the same are not explicitly mentioned.

Figure 6:
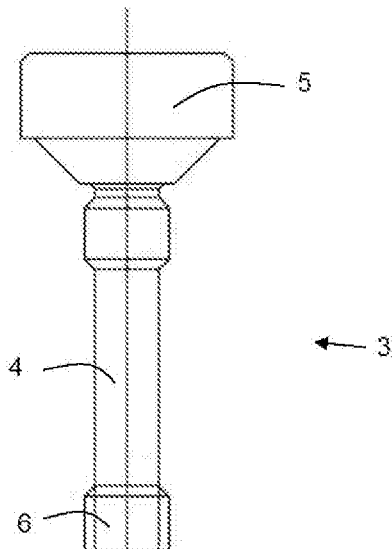
FIG. 6 is a frontal view of the fixing means for fixing to the implant (or to the replica thereof), shown in FIG. 1, according to an embodiment in which the fixing shaft and the head are firmly joined forming a single body.
Figure 7:
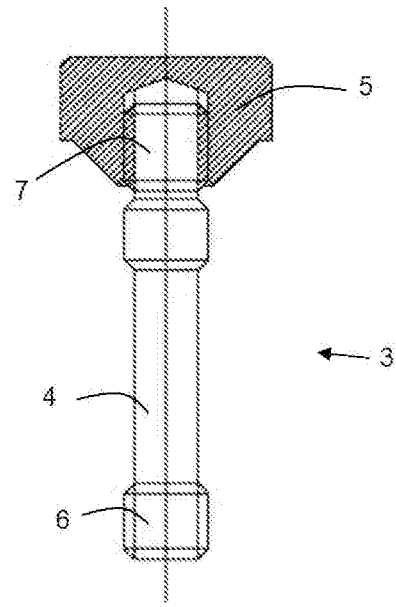
FIG. 7 is a view of the fixing means for fixing to the implant (or to the replica thereof) according to another embodiment of the abutment object of the invention, shown with the head and the upper end of the fixing shaft partially sectioned according to a vertical cut plane, in which the fixing shaft and the head are joined by means of a screwed joint.
Figure 8:
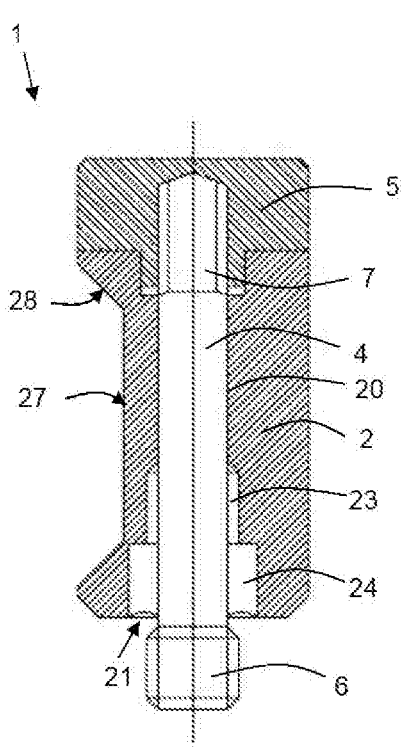
FIGS. 8 and 9 respectively show longitudinal section views, according to a vertical cut plane, of another embodiment of the abutment of the invention, in an operative fixing position and in an operative coupling position, respectively, in which the connection means for connection to the implant are arranged internally in the lower end section of the main body and in which the fixing shaft and the head are firmly joined.

In any of the embodiments shown, the dental scan abutment 1 essentially comprises a main body 2 and fixing means 3, the latter being depicted individually in FIGS. 6 and 7.

The fixing means 3 are in turn formed by a fixing shaft 4 and by an end head 5 arranged at the upper end 7 of the fixing shaft 4, while the lower end of the fixing shaft 4 is a threaded end 6 provided with a thread cutting complementary to the internal cutting of a threaded hole 82 (see FIGS. 11 and 14) which the implant 80 has to which the abutment 1 is adapted in order to be fixed.

In the case depicted in FIG. 6, the head 5 and the fixing shaft 4 are firmly joined forming part of one same body, that is to say, the fixing means 3 has a monoblock structure. The head 5 and the fixing shaft 4 can be made of the same material or different materials although they are joined in a permanent manner. Whereas, in FIG. 7, fixing means 3 are depicted in which the head 5 and the fixing shaft 4 are two bodies joined by means of a threaded joint (see thread cutting of the upper end 7 of the fixing shaft 4). In addition to the threaded joint, it is considered that the head 5 and the fixing shaft 4 can be joined (at the upper end 7) by means of an adhesive, pressure, rivet joint or a combination of threaded and adhesive joint.

It is noteworthy that in FIG. 4, FIG. 6 and FIG. 7, the head 5 has a smooth external surface without holes, notches or hollows for fitting external tools. Thus the head 5 does not have any hole for the passage of any screw to fix it to the implant 80, unlike in the scan abutments known in the prior art. In this way, the scan abutment 1 avoids the problems of noise and shining produced during the scanning associated with the presence of through-holes for the passage of a fixing screw in these abutments.

With respect to the main body 2, this is formed by a body provided with an indicator of the radial angular position of the anti-rotation means 81 of the implant 80 to which the abutment 1 is fixed during the scanning. Particularly, as is observed in the FIGS. 1 to 3, 8 to 10, 13 and 16 to 17, the external surface of the main body 2 comprises a recess in the form of a flat surface 27, parallel to the fixing shaft 4, which constitutes the indicator of the radial angular position of the anti-rotation means 81 of the implant 80. The position of the flat surface 27 is related to the precision with respect to the figure or geometry of the anti-rotation means 81 of the implant 80. In the depicted examples, the flat surface 27 is limited above and below by two flat portions 28 inclined with respect to the flat surface 27 forming an obtuse angle with the same, particularly 135°, although it is also considered that said flat portions 28 can be arranged forming 90° with the flat surface 27.

It is also observed that the main body 2 is provided with an axial hole 20 which passes through it vertically from the lower section thereof to the upper section thereof. The axial hole 20 is configured for the housing and displacement of the fixing shaft 4 therethrough although such that the fixing means 3 are joined in the manner of a safety pin to the main body 2 (provided the head 5 is joined to the upper end 7 of the fixing shaft 4).

In FIGS. 2 to 3, 8 to 9 and 16 to 17 it is observed that the axial hole 20 comprises a retention housing 23 for the threaded lower end 6 of the fixing shaft 4, formed by a widening, the diameter of which is equal to or greater than the external diameter of the threaded lower end 6 and which is limited above by a narrower section of axial hole 20 with a diameter essentially equal to the diameter of the fixing shaft 4. In this way, the threaded lower end 6 can never be accidentally displaced (that is to say, if the user does not expressly intend it) upwards away from the retention housing 23, only being able to be displaced between a retention position (which is also termed operative coupling position of the abutment 1 to the implant 80, as will be explained further), depicted in FIGS. 3, 9 and 17, in which the threaded end 6 is housed in the retention housing 23, being immersed in the interior of the main body and an end position, in which the threaded lower end 6 projects from the lower section of the main body 2 and the displacement thereof downwards is limited upon the head 5 stopping against the upper edge of the main body 2 (see FIGS. 2, 8 and 16). The length of the retention housing 23 is slightly greater than the length of the threaded end 6.

In fact, the head 5 of the fixing means 3 has a diameter or a width greater than the diameter of the fixing shaft 4 and equal to or greater than the diameter or width of the upper section of the main body 2 and said head 5 is configured for being rotated manually (without the need for tools) around the axial axis of the fixing shaft 4 and for firmly or jointly transmitting said rotation to the fixing shaft 4 with respect to the main body 2. In addition to being able to rotate it, the head 5 can also be pushed downwards, in the direction approaching the main body 2, or pulled upwards, separating it from the main body 2.

In the embodiment shown in FIGS. 2 and 3, it is important to point out that the narrower section of axial hole 20 which limits the retention housing 23 above is a section provided with a thread cutting 22 complementary to the thread cutting of the threaded end 6 of the fixing shaft 4 (they have the same thread passage). This narrower threaded section of the axial hole 20 which is provided with a thread cutting 22 allows for the fact that if the user of the scan abutment 1 so desires, the threaded end 6 can occupy and pass through said section in the longitudinal direction, upon rotating the head 5 in one direction or another.

Specifically, this embodiment of the scan abutment 1 shown in FIGS. 2 and 3 allows the user to be able to completely remove the fixing shaft 4 from the main body 2 through the upper end of the latter, rotating the head 5 in a determined direction, specifically in the direction contrary to that of the threading of the threaded end 6 in the threaded hole 82 of the implant 80. Rotating the head 5 in this manner, for example from the position depicted in FIG. 3, the threaded end 6 passes from the retention housing 23 to the narrower section immediately above, that is to say, to the section provided with the thread cutting 22. Once it has passed through this entire section, still pulling the head 5 upwards, the fixing shaft 4 is completely removed from the main body 2 since the rest of the sections of the axial hole 20 are not provided with thread cutting and have one diameter equal to or greater than the diameter of the fixing shaft 4. It is understood that the diameter of the fixing shaft 4 is that which the fixing shaft 4 has just above the threaded end thereof 6.

This option for complete removal allows for going deeper during cleaning and sterilization of the components of the scan abutment 1. Furthermore, this configuration also ensures that the fixing shaft 4 cannot be completely removed accidentally from the main body 2 (that is to say, the components continue being coupled in the manner of a safety pin) since for the complete removal, it is necessary for the user to expressly rotate the head 5 in the suitable direction, that is to say, it is not simply enough to pull the head 5 upwards, attempting to remove the fixing shaft 4 through the top of the main body 2, it has to be rotated.

Figure 14:
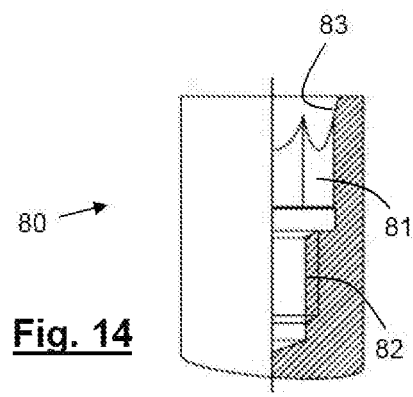
FIG. 14 is a partially sectioned elevation view, according to a vertical cut plane, of the upper part of the implant with internal connection shown in FIG. 13.

The main body 2 is also provided with connection means 21 for connection to the implant 80 which in turn is provided with anti-rotation means 81 and an internally threaded hole 82. The connection means 21 adopt a different configuration according to whether the implants 80 have anti-rotation means 81 with external connection (FIGS. 11 to 12) or with internal connection (FIGS. 14 to 15).

In the case of the abutments 1 depicted in FIGS. 1 to 5 and 8 to 9, the connection means 21 are arranged internally in the lower end section of the main body 2 and are formed by a connection housing 24 arranged in the lower end part of the axial hole 20 of the main body 2 and below the retention housing 23, as is particularly observed in FIGS. 2 to 3 and 8 to 9. It is observed that the connection housing 24 has a diameter or width greater than the external diameter of the threaded end 6 of the connection axis 4 since it has to be ensured that the threaded end 6 can be housed in the retention housing situated above the connection housing 24.

Figure 10:
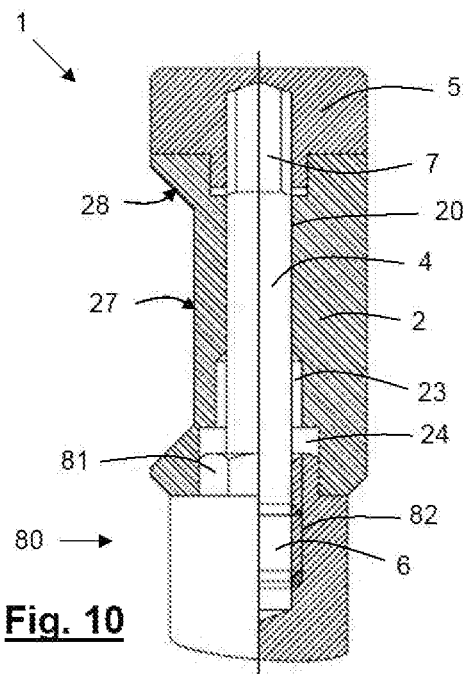
FIG. 10 is a longitudinal section view, according to a vertical cut plane, of the abutment of FIG. 8 in the operative fixing position in which, unlike in FIG. 8, the upper part of the implant (or the replica thereof) with external connection to which the abutment object of the invention is fixed is also shown.
Figure 11:
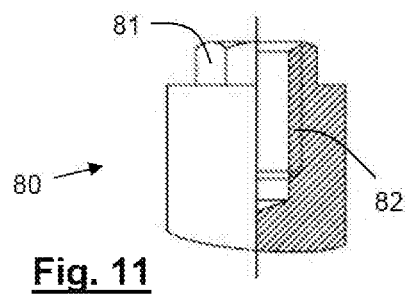
FIG. 11 is a partially sectioned elevation view, according to a vertical cut plane, of the upper part of the implant with external connection of FIG. 8 to which the abutment is fixed.
Figure 12:
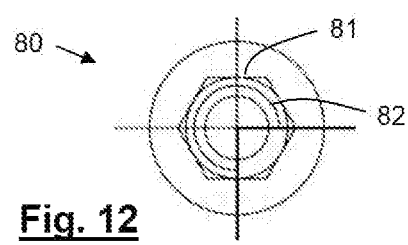
FIG. 12 is a plan view from above of the upper part of the implant of FIG. 11.

The connection housing 24 is configured by a cavity, the interior walls of which reproduce the complementary geometry of the external walls of the anti-rotation means 81 of an implant 80 with external connection such as for example that shown in FIGS. 11 and 12, allowing the introduction and lateral adjusted fitting of the anti-rotation means 81 with external connection in the connection housing 24 (see FIG. 10).

Normally, the anti-rotation means 81 of the implants 80 with external connection are usually formed by a prism with a regular polygonal base, such as for example a hexagonal prism in the examples depicted in the figures, although they can also have a geometric figure provided with lobes, merlons, channels or elements also intended to lock the rotation in this case between the implant 80 and the main body 2 of the dental scan abutment 1.

Whereas, in dental scan abutments 1 intended to be assembled and fixed on implants 80 with internal connection, such as the implant shown in FIGS. 14 and 15, the means connection 21 are arranged externally on the lower end section of the main body 2, the connection means 21 comprising an end connection area 25 configured by external walls which reproduce the complementary geometry of the internal walls of the anti-rotation means 81 of the implant 80 with internal connection. The end connection area 25 must be introduced and fitted laterally with adjustment in the anti-rotation means 81 with internal connection of the implant 80 (see FIG. 13). Specifically in the implants 80 with internal connection, the anti-rotation means 81 are formed by a hole, the walls of which have a specific geometry, for example a hole with polygonal section (hexagonal in the depicted example) or provided with lobes, merlons, channels or elements also intended to lock the rotation of the implant 80 with respect to the main body 2 of the dental scan abutment 1.

In the FIGS. 13, 16 and 17, it is observed that the connection means 21 for connection to the implant 80 comprise, in this case, in addition to the end connection area 25, a linking area 26, below and above the end connection area 25, configured by a conical external surface with equal conicity to that of the cone 83 with internal connection which precedes the anti-rotation means 81 of the implant 80 (see the cone 83 situated in the mouth of the hole of the implant 80 of FIG. 14). It is also observed that the lower section of the main body 2 in which the connection means 21 are externally arranged coincides internally with the section of the axial hole 20 in which the retention housing 23 for the threaded lower end 6 of the fixing shaft 4 is arranged.

The method for the assembly and fixing of the dental scan abutment 1 to an implant 80 is set out below.

Figure 9:
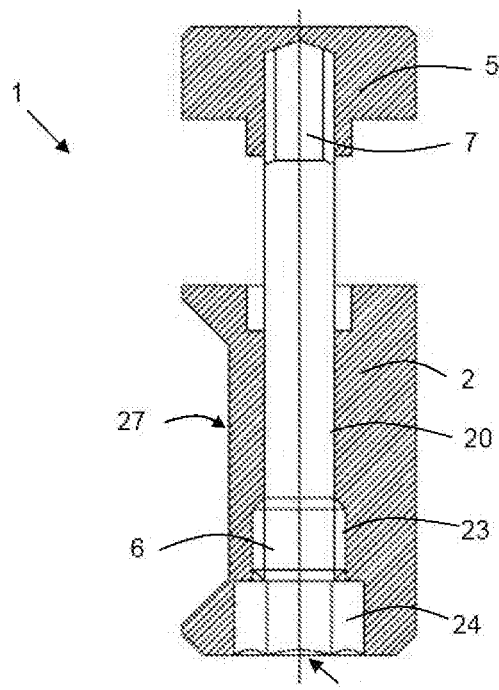

Firstly, the abutment 1 is held with the fingers such that the threaded end 6 of the fixing shaft 4 is introduced into the retention housing 23, as is depicted in FIGS. 3, 9 and 17, without said end projecting from the lower edge of the main body 2. To achieve this position, the individual can pull the head 5 upwards, that is to say, in the direction of separation from the main body until the displacement of the threaded end 6 upwards is prevented upon being retained in the retention housing 23. Another way of achieving the threaded end 6 being within the retention housing is to allow for the longitudinal displacement to be produced by itself upon contacting the threaded end 6 with the implant 80.

It should be remembered at this point that the length of the retention housing 23 (measured in the vertical direction, parallel to the axial direction of the fixing shaft 4) is somewhat greater than the length of the threaded end 6 such that in the operative coupling position, the threaded end 6 is not pressed down.

The abutment 1 is then placed on the implant 80 gauging or moving it slightly until noting that the connection means 21 of the abutment 1 are connected to the anti-rotation means 81 of the implant 80, thus adopting an operative coupling position. In said position, the threaded end 6 continues to be in the retention housing 23.

In the case of the abutments 1 indicated for the assembly and fixing to implants 80 with external connection, the connection housing 24 will have descended (together with the rest of the abutment 1) until it has received, in the interior thereof and in an adjusted manner, the anti-rotation means 81 of the implant 80. For example, during the use of the abutments 1 depicted in the FIGS. 1 to 5 and 8 to 9, the straight walls which form the hexagonal connection housing 24 are arranged parallel to the respective faces of the hexagonal prism of the anti-rotation means 81 of the implant 80 of FIGS. 11 and 12, whereby the anti-rotation function is active without the possibility of rotating the main body 2 with respect to the implant 80.

Whereas, in the case of the abutments 1 indicated for the assembly and fixing to implants 80 with internal connection, for the case of the abutments 1 depicted in FIGS. 16 to 17, it is the end connection area 25 of the main body 2, which will have descended (together with the rest of the abutment 1) and will have been introduced into the hole or cavity with polygonal section which constitutes the anti-rotation means 81 of the implant 80 of FIGS. 14 and 15. In the example depicted, in said operative coupling position, the faces or straight external walls which form the hexagonal prismatic end connection area 25 are arranged parallel to the respective walls which form the hole with hexagonal section with internal cone which constitutes the anti-rotation means 81 of the implant 80 of FIGS. 14 and 15, thus activating the anti-rotation function of the main body 2 with respect to the implant 80.

For guidance, FIGS. 3, 9 and 17 would represent the operative coupling position, if the implant 80 with the anti-rotation means thereof 81 had been depicted connected to the connection means 21 of the abutment 1 in the manner explained in the previous paragraphs since the position of the fixing means 3 is practically the same.

Figure 13:
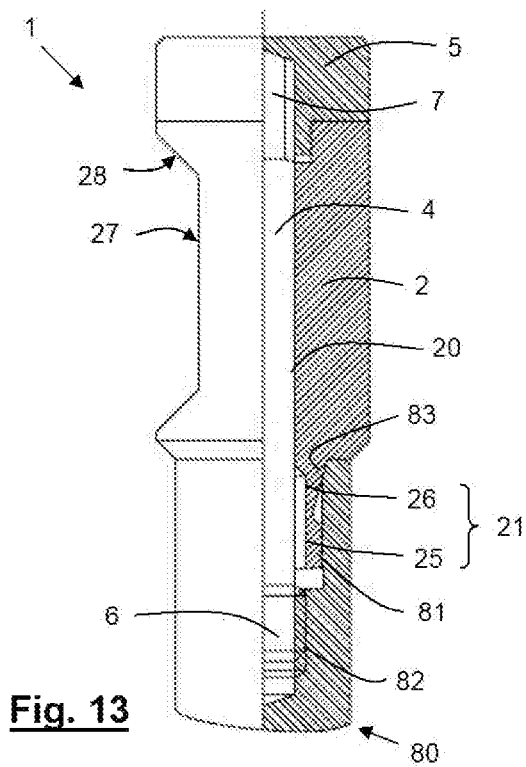
FIG. 13 is a longitudinal section view, according to a vertical cut plane, of another embodiment of the abutment object of the invention in the operative fixing position in which the upper part of the implant (or the replica thereof) with internal connection to which the abutment object of the invention is fixed is also shown.

Then, once the abutment 1 is coupled to the implant 80, the former should be fixed to the latter and adopt an operative fixing position, depicted in FIGS. 10 and 13. In order to adopt this operative fixing position, departing from the operative coupling position, the head 5 should be rotated with respect to the main body 2 according to an axis parallel to the axial axis of the fixing shaft 4 until the threaded end 6 of the fixing shaft 4 projects from the main body 2 and is threaded in the threaded hole 82 of the implant 80 or of the replica thereof.

In order to undo the fixing and decouple the abutment 1 from the implant 80 following the scanning, it is sufficient to rotate the head 5 in the opposite direction to the one before, whereby the threaded end 6 will raise until leaving the threaded hole 82, and then hold the main body 2 with the fingers and separate it from the implant 80 moving it upwards until the anti-rotation means 81 of the implant 80 are disconnected from the connection means 21 of the abutment 1.

Thus, it is demonstrated that the dental scan abutment 1 previously described makes the assembly and disassembly of the same possible with respect to the implant 80 without the aid of any tool, which makes it especially useful in the interior of the mouth of the patient, especially in the cases of inner molars where the space for the use of tools is more scarce. The connection and fixing is reliable and simple, whilst avoiding the problems of noise and shining attributed to the presence of bores for the passage of a screw in conventional scannable abutments of the prior art.

The invention claimed is:

1. A dental assembly comprising a scan abutment and a dental component, the abutment configured to be operatively fixed to a dental component, wherein the dental component is a dental implant or a replica of a dental implant, the dental component having anti-rotation means for preventing relative rotation between the dental component and the abutment when the abutment is operatively fixed to the dental component, the dental component further having an internally threaded hole; and wherein the abutment comprises:
   a main body, comprising:
      a distinctive surface that indicates an angular position of the anti-rotation means when the abutment is operatively fixed to the dental component;
      an axial hole passing through a lower section of the main body and extending to an upper section of the main body, the lower section of the main body configured to mate with the anti-rotation means of the dental component;
   a fixing shaft that fixes the abutment to the dental component, wherein the fixing shaft comprises a threaded lower end, an intermediate section, and an upper end, wherein the threaded lower end has a thread complementary to an internal thread of the internally threaded hole of the dental component and the threaded lower end of the fixing shaft forms a widening section relative to a diameter of the intermediate section, and wherein the upper end comprises an end head with a diameter or width greater than the diameter of the intermediate section and equal to or greater than a diameter or width of the upper section of the main body, the end head is configured to be manually rotated around an axial axis of the fixing shaft and cause rotation of the fixing shaft with respect to the main body, the end head has an external surface, facing away from the fixing shaft, that is smooth and without holes, notches or hollows for mating with an external tool, wherein the external surface is a distal end surface of the fixing shaft;
   wherein the axial hole of the main body comprises a retention housing for the threaded lower end of the fixing shaft, the retention housing formed by a widening of the axial hole, the retention housing limited at a top of the retention housing by a narrower section of the axial hole having an essentially equal diameter to the diameter of the intermediate section of the fixing shaft or the narrower section is a threaded section having a thread complementary to the thread of the threaded lower end of the fixing shaft so that the threaded lower end is configured to occupy and pass through said narrower section in a longitudinal direction upon rotating the head in one direction or another, the threaded lower end of the fixing shaft configured to be inserted in the main body and project from the lower section of the main body, and wherein the complete removal of the fixing shaft from the main body by only longitudinally displacing the fixing shaft with respect to the main body is prevented by abutment of the threaded lower end against the narrower section of the retention housing, wherein the distinctive surface is an external surface of the main body in the form of a single flat surface parallel to the fixing shaft and recessed in the main body, wherein the flat surface is limited at least at a top and bottom of the flat surface by two flat portions inclined with respect to the flat surface forming a right or obtuse angle with respect to the flat surface.

2. The dental assembly according to claim 1, wherein the narrower section of axial hole comprises a thread complementary to the thread of the threaded lower end of the fixing shaft, so that the threaded lower end passes through the narrow section in the longitudinal direction, upon rotating the end head in one direction or another.

3. The dental assembly according to claim 1, wherein the lower section of the main body is formed by a connection housing below the retention housing, and the connection housing is a cavity having interior walls with a geometry that is complementary to external walls of the anti-rotation means, so that the anti-rotation means mates with the connection housing.

4. The dental assembly according to claim 1, wherein the lower end section of the main body comprises exterior walls with a geometry that is complementary to internal walls of the anti-rotation means, so that the anti-rotation means mates with the lower section of the main body.

5. The dental assembly according to claim 4, wherein the lower section of the main body comprises a linking section, next to and above the exterior walls and the linking section has a conical external surface configured to match an internal conical section of the dental component.

6. The dental assembly according to claim 4, wherein that the lower section of the main body is axially aligned with the axial hole of the main body.

7. The dental assembly according to claim 1, wherein the abutment is configured to adopt an operative position for coupling to the dental component, in which the threaded lower end of the fixing shaft is introduced into the retention housing at a same time that the lower section of the main body mates with the anti-rotation means of the dental component, and wherein the threaded lower end projects from the main body and is joined by a threaded joint to the dental component.

8. The dental assembly according to claim 1, further configured to be operatively fixed to the dental component by rotating the end head in one direction with respect to the main body and to be operatively un-fixed to the dental component by rotating the end head in another direction with respect to the main body.

9. The dental assembly according to claim 1, wherein the end head and the fixing shaft are two bodies separable from each other, configured to be joined at least by one of the following types of joints: a threaded, adhesive, pressure or rivet joint.

10. The dental assembly according to claim 1, wherein the end head and the fixing shaft are a one-piece integral construction.

11. The dental assembly according to claim 1, wherein the distal end surface lies in a plane that is orthogonal to a longitudinal center axis of the fixing shaft.

12. The dental assembly according to claim 11, wherein the distal end surface remains visible when fully assembled with the main body.

13. The dental assembly according to claim 1, wherein the diameter or width of the end head is equal to or greater than a largest diameter or a largest width of the upper section of the main body taken in a plane orthogonal to a longitudinal axis of the main body.

14. The dental assembly according to claim 13, wherein a distal end of the upper section of the main body abuts the fixing shaft in an axial direction when the fixing shaft is fully assembled with the main body.

* * * * *